(12) United States Patent
Betts

(10) Patent No.: US 12,453,624 B2
(45) Date of Patent: Oct. 28, 2025

(54) POLYMER-FREE DRUG ELUTING VASCULAR STENTS

(71) Applicant: Biotronik AG, Buelach (CH)

(72) Inventor: Ronald E. Betts, La Jolla, CA (US)

(73) Assignee: BIOTRONIK AG, Buelach (CH)

( * ) Notice: Subject to any disclaimer, the term of this patent is extended or adjusted under 35 U.S.C. 154(b) by 167 days.

(21) Appl. No.: 16/334,247

(22) PCT Filed: Sep. 19, 2017

(86) PCT No.: PCT/EP2017/073622
§ 371 (c)(1),
(2) Date: Mar. 18, 2019

(87) PCT Pub. No.: WO2018/050916
PCT Pub. Date: Mar. 22, 2018

(65) Prior Publication Data
US 2019/0388210 A1    Dec. 26, 2019

Related U.S. Application Data

(60) Provisional application No. 62/437,685, filed on Dec. 22, 2016, provisional application No. 62/396,248, filed on Sep. 19, 2016.

(51) Int. Cl.
| | | |
|---|---|---|
| *A61L 29/08* | (2006.01) |
| *A61F 2/00* | (2006.01) |
| *A61K 31/337* | (2006.01) |
| *A61K 31/436* | (2006.01) |
| *A61K 31/4453* | (2006.01) |
| *A61L 31/08* | (2006.01) |
| *A61L 31/16* | (2006.01) |
| *A61K 9/00* | (2006.01) |

(52) U.S. Cl.
CPC .......... *A61F 2/0077* (2013.01); *A61K 31/337* (2013.01); *A61K 31/436* (2013.01); *A61K 31/4453* (2013.01); *A61L 31/08* (2013.01); *A61L 31/16* (2013.01); *A61F 2250/0068* (2013.01); *A61K 9/0024* (2013.01); *A61L 2300/416* (2013.01)

(58) Field of Classification Search
CPC .......... A61L 2300/416; A61L 2420/02; A61L 2300/606; A61L 2300/802; A61L 29/08; A61L 2420/06; A61L 31/08; A61L 31/16; A61L 27/28; A61L 27/00; A61L 2300/42; A61F 2250/0025; A61F 2250/0026; A61F 2/82; A61F 2/0077; A61K 9/0024; A61K 31/00; A61K 47/6967; A61K 31/65; A61K 9/00; A61P 35/00; A61P 9/00; A61P 9/10; A61P 7/02
See application file for complete search history.

(56) References Cited

U.S. PATENT DOCUMENTS

| | | |
|---|---|---|
| 5,288,711 A | 2/1994 | Mitchell et al. |
| 5,306,286 A | 4/1994 | Stack et al. |
| 5,342,348 A | 8/1994 | Kaplan |
| 5,527,337 A | 6/1996 | Stack et al. |
| 5,707,385 A | 1/1998 | Williams |
| 5,824,048 A | 10/1998 | Tuch |
| 5,873,904 A | 2/1999 | Ragheb et al. |
| 6,013,853 A | 1/2000 | Athanasiou et al. |
| 6,099,562 A | 8/2000 | Ding et al. |
| 6,153,252 A | 11/2000 | Hossainy et al. |
| 6,159,488 A | 12/2000 | Nagler et al. |
| 6,171,609 B1 | 1/2001 | Kunz |
| 6,258,121 B1 | 7/2001 | Yang et al. |
| 7,357,854 B1 * | 4/2008 | Andreacchi ............... C25F 3/16 |
| | | 205/684 |
| 9,012,506 B2 | 4/2015 | Faucher et al. |
| 2003/0059454 A1 * | 3/2003 | Barry ........................ A61P 9/00 |
| | | 604/93.01 |
| 2006/0069427 A1 | 3/2006 | Savage et al. |
| 2006/0095123 A1 * | 5/2006 | Flanagan ................ A61L 31/10 |
| | | 623/1.46 |
| 2007/0104753 A1 | 5/2007 | Flanagan |
| 2007/0190231 A1 * | 8/2007 | Chandrasekaran ....... C23C 8/10 |
| | | 427/2.25 |
| 2008/0208313 A1 * | 8/2008 | Yu ......................... A61L 31/088 |
| | | 427/2.24 |
| 2012/0213709 A1 * | 8/2012 | Tamarkin ........... A61K 31/7056 |
| | | 424/43 |
| 2012/0290076 A1 * | 11/2012 | Savage ................... A61L 31/16 |
| | | 623/1.42 |
| 2013/0053947 A1 * | 2/2013 | Kangas .................. A61L 29/16 |
| | | 623/1.42 |

(Continued)

FOREIGN PATENT DOCUMENTS

| | | |
|---|---|---|
| EP | 2793967 | 10/2014 |
| WO | 1997035575 | 10/1997 |
| WO | 2013182503 | 12/2013 |

OTHER PUBLICATIONS

Liu et al., Circulation 79: 1374-1387 (1989).

*Primary Examiner* — Tracy Liu
(74) *Attorney, Agent, or Firm* — Lewis Kohn & Walker LLP; David M. Kohn; Kari Moyer-Henry

(57) ABSTRACT

This application relates generally to the field of implants and more specifically to drug eluting vascular stents and methods of making and using same. Specifically, this technology relates to controlled release of drug from an implant and particular from a stent without the presence of polymer or alteration of the implant surface.

14 Claims, 1 Drawing Sheet

(56) References Cited

U.S. PATENT DOCUMENTS

| | | | | |
|---|---|---|---|---|
| 2014/0322291 A1* | 10/2014 | Berg | ................... | A61M 25/104 424/423 |
| 2015/0258251 A1* | 9/2015 | Drumheller | ............. | A61L 27/28 604/103.02 |
| 2016/0213890 A1* | 7/2016 | Kaufman | .............. | A61L 29/085 |

* cited by examiner

| Drug | $ElogP_{oct}$ |
|---|---|
| Sirolimus | 6.4 |
| Everolimus | 6.7 |
| Biolimus A9 | 7.4 |
| CRC-015 | 9.4 |

POLYMER-FREE DRUG ELUTING VASCULAR STENTS

FIELD OF THE INVENTION

This application relates generally to the field of implants and more specifically to drug eluting vascular stents and methods of making and using same. Specifically, this technology relates to controlled release of drug from an implant and particular from a stent without the presence of polymer or alteration of the implant surface.

BACKGROUND OF THE INVENTION

Coronary artery disease (CAD) is a widespread disease, affecting millions of men and women in the US. In many patients with CAD, percutaneous transluminal coronary angioplasty (PTCA) is a widely used treatment method. The employment of PTCA has been a viable option for the last four decades, though many angioplasty techniques have been limited by frequently occurring complications, including vessel dissection, restenosis, recoil and thrombosis.

During the healing process, inflammation caused by angioplasty and stent implant injury often causes smooth muscle cell proliferation and regrowth inside the stent, thus partially closing the flow channel, and thereby reducing or eliminating the beneficial effect of the angioplasty/stenting procedure. Blood clots may also form inside of the newly implanted stent due to the thrombotic nature of the stent surfaces, even when biocompatible materials are used to form the stent. Restenosis results in significant more morbidity and mortality and frequently necessitates further interventions such as repeated angioplasty or coronary by-pass surgery.

Peripheral arterial disease (PAD) is a disease in which plaque builds up in the arteries that carry blood to the head, organs, and limbs, resulting in the narrowing of these arteries, ultimately leading to stenosis.

The processes responsible for stenosis after PTCA (or as a result of PAD) are not completely understood. Although PTCA causes plaque compression, the major change in lumen geometry is caused by fracturing and fissuring of the atheroma, extending into the vessel wall at variable depths and lengths (Grech, *BMJ* 326(7398): 1080-1082 (May 17, 2003)). Restenosis occurring in the first six months after angioplasty is caused largely by smooth muscle cell proliferation and fibrointimal hyperplasia (often called neointimal proliferation), as well as elastic recoil. It is usually defined as a greater than 50% reduction in luminal diameter and has an incidence of 25-50% (higher after vein graft angioplasty) (Id.).

Direct evidence has come from the study of restenotic lesions in coronary and peripheral arteriosclerotic arteries treated with arterectomy. Tissue specimen from these lesions consisted almost entirely of hyperplastic smooth muscle. Medial smooth muscle cells are the major component of the arterial wall, and the only major reparative or reactive response of the arterial wall to various types of injury, either mechanical or inflammatory, is intimal proliferation from these cells (Liu et al., *Circulation* 79: 1374-1387 (1989)).

The first large randomized studies conclusively showed the superiority of stenting over coronary angioplasty alone, both in clinical and angiographic outcomes, including a significant 30% reduction in restenosis rates. Surprisingly, this was not due to inhibition of neointimal proliferation. The superiority of stenting is that the initial gain in luminal diameter is much greater than after angioplasty alone, mostly because of a reduction in elastic recoil (Id.).

The early generation stents were not without their problems. Thrombosis within a stent (resulting in myocardial infarction) was a significant risk factor, often leading to major complications and even death. Early anticoagulation methods were deployed to combat these problems, but often led to their own, separate complications, including arterial puncture wounds and systemic hemorrhaging within the localized sites (Grech et al., *Practical Interventional Cardiology*, $2^{nd}$ Ed, 279-294 (2002)). However, the risks involved with thrombosis within a stent have been diminishing for several years since the development of antiplatelet drugs and associated treatment regimens.

A greater understanding of the pathophysiology of stent deployment, combined with the development of more flexible stents (which are pre-mounted on low-profile catheter balloons), has resulted in a massive worldwide increase in stent use, and they have become an essential component of coronary intervention. Low profile stents have also allowed "direct" stenting—that is, implanting a stent without the customary balloon dilatation—to become prevalent, with the advantages of economy, shorter procedure time, and less radiation from imaging. Most modern stents are expanded by balloon and made from biocompatible metal alloys. Their construction and design, metal thickness, surface coverage, and radial strength vary considerably.

A more recent innovation in the field of stent engineering has been the introduction of drug eluting stents. Many studies have shown the inclusion of drug eluting stents have dramatically reduced the incidence of restenosis. Most stents are made of a metal alloy and are usually constructed in a wire mesh fashion. Stents generally have a very smooth surface due to an electro-polishing treatment. Typically, a polymeric layer is applied to the smooth stent surface and serves as a carrier of an active pharmaceutical ingredient. During application, this active pharmaceutical ingredient is released or eluted from this polymeric layer.

If the polymer is bioerodable, in addition to release of the drug through the process of diffusion, the bioactive agent may also be released as the polymer degrades or dissolves, making the agent more readily available to the surrounding tissue environment. Bioerodable stents and biodurable stents are known where the outer surfaces or even the entire bulk of the polymer material is porous. PCT Publication No. WO 99/07308 discloses such bioerodable stents and include liquid-infusable mechanical anchoring layers attached to the stent. When bioerodable polymers are used as drug delivery coatings, porosity is variously claimed to aid tissue ingrowth, make the erosion of the polymer more predictable, or to regulate or enhance the rate of drug release, as, for example, disclosed in U.S. Pat. Nos. 6,099,562, 5,873,904, 5,342,348, 5,873,904, 5,707,385, 5,824,048, 5,527,337, 5,306,286, and 6,013,853.

A variety of agents specifically claimed to inhibit smooth muscle-cell proliferation, and thus inhibit restenosis, have been proposed for release from endovascular stents.

U.S. Pat. No. 6,159,488 describes the use of a quinazolinone derivative in order to control the release of the drugs for the prevention of restenosis following angioplasty.

U.S. Pat. No. 6,171,609 teaches the use of an intravascular stent comprising a coating of taxol in order to inhibit or reduce restenosis following placement of the stent. Also disclosed are methods for the direct and/or targeted delivery of therapeutic agents to vascular smooth muscle cells that cause a dilation and fixation of the vascular lumen by inhibiting smooth muscle cell contraction, thereby constituting a biological stent.

U.S. Pat. No. 6,258,121 discloses a stent having a polymeric coating for controlled release of an agent, wherein the polymeric coating a first and second polymeric material, as well as the use of PLA-PEO and PLA-PCL copolymers in order to control the pace of the drug release.

U.S. Pat. Nos. 5,288,711 and 6,153,252 both describe vascular stents coated with an immunosuppressant, namely, rapamycin, which was reported to suppress both smooth muscle cell and endothelial cell growth. Rapamycin has been shown to have improved effectiveness against restenosis when delivered from a polymer coating on a stent.

PCT Publication No. WO 97/35575 describes the macrocyclic triene immunosuppressive compound everolimus and related compounds for the treatment of restenosis as a consequence of proliferation and migration of intimal smooth muscle cell as induced by vascular surgeries such as angioplasty.

U.S. Pat. No. 9,012,506 discloses cross-linked fatty acid based biomaterials for use in coating medical devices, wherein the fatty acid-derived biomaterial may be utilized alone or in further combination with a series of additional substances, namely, a glyceride, glycerol or fatty alcohol. However, each of the above embodiments must have at least one fatty acid associated with the combination to form an appropriate biomaterial for the medical device coating.

The prior art also teaches drug-coated stents, which are polymer-free. Such stents are based on bare metal. These bare metal-based stents have a microscopically rough, porous surface made up of micropores with a density of approximately 1,000,000 pores per $cm^2$ and an average micropore depth of approximately 2 µm that permits absorption of different organic substances such as the drugs to be released or eluted. For the coating of the stent with the drug, the bare metal stent is contacted with a solution or dispersion, which contains the drug to be released. The coating solution or dispersion fills the micropores completely and creates a uniform layer after evaporation of the solvent.

A drug-eluting stent system with a dose-adjustable, polymer-free, on-site stent coating has already been used in the prevention of restenosis (Hausleiter et al., *European Heart Journal* 26; 1475-1481 (2005)). Specifically, the drug eluting stent described in Hausleiter et al. consists of a microporous stent surface which is meant to increase the drug reservoir capacity and provides for a slower, measured drug release without the use of a polymer. However, this stent surface was required to be heavily modified from a smooth metal variety in order to provide the pores needed to increase drug reservoir capacity and control the release of the drug. Furthermore, the differences in restenosis prevention between the non-polymer-based, paclitaxel-coated stents (having an unaltered metal surface) and the polymer-free, rapamycin-eluting (surface modified to include micropores) stent is believed to be attributable to differences in drug-release kinetics based on the different strut surfaces between the stent surfaces.

In addition to paclitaxel, numerous studies have evidenced the effects of other anti-inflammatory and anti-proliferative substances such as sirolimus, tacrolimus, everolimus, ABT-578, biolimus, and QP2, as well as other drugs (including dexamethasone, 17-beta-estradiol, batimastat, actinomycin-D, and cyclosporin) (Silber, *Z Kardiol* 93(9):649-663 (2004)).

A review of the prior art identifies several variations to the above mentioned themes regarding proposed solutions to complicating factors associated with PTCA as well as the prevention of neointimal proliferation, restenosis and associated clinical events. While the growing use of stents has improved the results of percutaneous coronary revascularization, in-stent restenosis continues to limit the long term success of this approach. The state of the art has evolved from bare metal stents with no drug to stents having a polymeric coating which, coupled with application of a drug, is capable of slowly releasing the drug agent to affected tissues.

Stent thrombosis is a serious complication resulting from the formation of thrombus in the stent lumen. The polymers utilized to contain and control drug release as well as the material and design of the underlying stent have been implicated in thrombosis. Thrombus formation can occur at any time during or after the stenting procedure and, because thrombosis can have very serious patient consequences, a large effort has been made to better understand the causal agent and means to reduce or eliminate this complication. In vitro studies have shown that the physical surface characteristics of a stent can greatly effect thrombogenicity. Electrochemical polishing of stainless steel coronary stents to smoothen surfaces resulted in significantly decreased thrombogenicity from the polished stents as compared to nonpolished stent surfaces (De Scheerder et al., *J Am Coll Cardiol* 31(2s1): 277 (1998)). Likewise, stents with a grit blasted porous surface finish have been used as highly thrombogenic positive controls during platelet antagonistic studies (Makkar et al., *Eur Heart J* 19: 1538-1539 (1998). Electropolishing of metallic stent surfaces has now become standard throughout the industry.

Although the use of antithrombotic drugs in conjunction with stenting has reduced the incidence of thrombosis, the risk still can range from around 0.3 to 3.1% depending on patient clinical presentation (Cook and Windecker, *Circulation* 119:657-659 (2009)). Roughened stent surface topography is especially concerning during situations of inadequate stent deployment where malapposed stent surfaces can become foci for thrombus formation. Clearly there is a need for improved stent designs that utilize controlled release restenosis inhibiting drugs without the use of polymers or roughened stent surfaces.

More recently, the field has recognized shortcomings associated with use of a polymer (ie. a substance composed of repeating structural units or monomers, connected to each other via covalent bonds) to bind the drug agent on the stent surface. Initially, the idea of a matrix polymer to which the drug is to be bound was a huge benefit, as each polymer would have defined drug release kinetics, resulting in a consistent delivery of the drug agent as slowly eluted from the stent. This would enable a stable elution profile, based on defined kinetics, over a period of time spanning weeks or months. These early polymer-based, drug eluting stents used synthetic, nonresorbable polymers such as poly-n-butyl methacrylate and polyethylene vinyl acetate (with sirolimus) and a poly (styrene-b-isobutylene-b-styrene) copolymer (with paclitaxel) in order to optimize the drug release profile of the stents (Rogers, *Rev Cardiovasc Med* 5(Suppl 2): S9-S15 (2004)). However, these stents, due to the polymers deployed in the coating, were found to be associated with adverse allergic reactions, delayed healing and incomplete endothelialization, resulting in an increased risk of stent thrombosis when compared to bare metal stents with no polymeric coating (Daemen et al. *Lancet* 369(9562):667-678 (2007)).

The deficiencies discovered in the early polymer coatings resulted in yet another innovation, namely, modifying the physical properties of the stent surface (ie. roughened, porous or textured surfaces) in order to avoid using a polymer (ie. polymer-free, drug eluting stent). Unfortunately, such surface modifications have turned out to be very expensive and, more importantly, lack the comprehensive, long term studies to evidence a suitable reduction in life threatening events, such as stent thrombosis, following stent implantation. In fact, it is now understood that certain polymers can actually be associated with specific thrombotic events. Furthermore, preclinical studies have estimated that up to 40% of the drug coated on the stent is lost during stent delivery of polymer-free based systems, including drug release profiles that are suboptimum. (Lansky et al., *Circulation* 109:1948-1954 (2004)). Accordingly, sand blasted stent surfaces have been treated with a drug containing combination of biodegradable polymers and shellac to better control drug release rates and reduce drug loss. (Xhepa et al., Indian Heart Journal 66: 345-349 (2014)). Additional, known deficiencies in the prior art of drug eluting stents include delamination of drug from the stent during insertion, drug elution rates that are far too rapid to result in an improved therapeutic benefit and microtexturing of stent surfaces have proved far too costly in terms of manufacturing costs with minimal correlating benefit to patients.

There remains a great need in the art to solve the problem of creating a drug eluting stent system comprising a polymer-free surface coating by which the drug can bind, further wherein the physical properties of the stent surface remain unaltered from a smooth topography. It is desirable to provide a stent capable of providing a preferred elution rate for a drug without comprising the mechanical integrity of the stent during and after deployment.

SUMMARY OF THE INVENTION

The present invention provides for implants comprising a coating layer, wherein the coating is formulated with at least one polymer-free excipient and at least one therapeutic agent preferably comprising an antiproliferative agent, and more preferably a macrocyclic triene immunosuppressive compound. The coating layer is applied to an implant preferably being capable of radial expansion. The implant has a surface that lacks structural modification in a meaning that would make the surface of the implant have a non-smooth surface and is hence substantially smooth in texture, preferably accomplished by polishing, preferably electro-polishing. Further, the implant is devoid of any surface modification that would result in a drug reservoir at more than one point on the implant surface. Preferably, the coating layer is applied to the implant body, wherein the body has surfaces that are topographically smooth and are nonporous with respect to the material used to form the surfaces. The implant can be used in delivering at least one therapeutic agent to a target. In one embodiment of the invention the surface of the implant is made microscopically smooth as described herein and has been treated with an additional layer such as adhesive layer, porous layers or specific biocompatible layers. In a particular embodiment of the invention the surface of the implant is made microscopically smooth as described herein and the surface of the implant is made microscopically smooth, e.g. by electropolishing, and treated with a layer of silicon carbide and preferably a layer of amorphous hydrogen rich silicon carbide, preferably in a plasma-enhanced, vapor deposition process. Also, in a another embodiment the implant surface is further free of any additional layers such as adhesive layer, porous layers or specific biocompatible layers and the coating layer is directly applied onto the surface of the implant body.

In a preferred embodiment the present invention provides for a drug eluting stent comprising a coating layer, wherein the coating is formulated with at least one polymer-free excipient and at least one therapeutic agent preferably comprising an antiproliferative agent, and more preferably a macrocyclic triene immunosuppressive compound. Particularly suitable macrocyclic triene immunosuppressive compounds are further specified below. The coating layer is applied to a stent frame being capable of radial expansion. The drug eluting stent has a surface that lacks structural modification in a meaning that would make the surface of the stent have a non-smooth surface and is hence substantially smooth in texture, preferably accomplished by polishing, preferably electro-polishing. Further, the stent is devoid of any surface modification that would result in a drug reservoir at more than one point on the stent surface. Preferably, the coating layer is applied to the stent frame, wherein the stent frame has surfaces that are topographically smooth and are nonporous with respect to the material used to form the surfaces. The drug eluting stent can be used in delivering at least one therapeutic agent to a target. In one embodiment of the invention the surface of the stent is made microscopically smooth as described herein and has been treated with an additional layer such as adhesive layer, porous layers or specific biocompatible layers. In a particular embodiment of the invention the surface of the stent is made microscopically smooth as described herein and the surface of the stent is made microscopically smooth, e.g. by electropolishing, and treated with a layer of silicon carbide and preferably a layer of amorphous hydrogen rich silicon carbide, preferably in a plasma-enhanced, vapor deposition process. Also, in a another embodiment the stent surface is further free of any additional layers such as adhesive layer, porous layers or specific biocompatible layers and the coating layer is directly applied onto the surface of the stent frame.

In one aspect, the present invention provides for an implant and in particular for a drug eluting stent having a coating to which a drug may be noncovalently bound in order to deliver a measured release of the drug at a target site. One embodiment provides for the coating to comprise a non-polymer, linear, branched or cyclic, saturated or unsaturated fatty alcohol or fatty aldehyde based composition which herein also referred to as polymer-free excipient. In an alternative embodiment, the coating comprises a non-polymer, nonionic, linear hydrocarbon surfactant. Examples of non-polymeric coatings or polymer-free excipient are lauryl alcohol, undecyl alcohol, myristyl alcohol, pentadecyl alcohol, palmitoleyl alcohol, palmityl alcohol, isocetyl alcohol, heptadecanol, lanolin alcohol, stearyl alcohol, isostearly alcohol, 12-hydroxystearyl alcohol, heneicosyl alcohol, behenyl alcohol, erucyl alcohol, 1-tricosanol, lignoceryl alcohol, 1-pentacosanol, ceryl alcohol, 1-heptacosanol, montanyl alcohol, 1-nonacosanol, myricyl alcohol, 1-hentriacontanol, lacceryl alcohol, 1-tritriacontanol, geddyl alcohol, arachidic acid, behenic acid, lignoceric acid and cerotic acid and the like as well as the aldehyde version of each material. Preferably the fatty alcohol or fatty aldehyde or nonionic surfactant is linear and contains at least 16 carbon atoms. Alternatively, more preferably, the coating comprises a compound having the formula $C_xH_yO$, wherein x is at least 16 and y is at least 26. Yet more preferably, the coating comprises a compound having the formula $C_xH_yO$, wherein x is at least 18 and at the most 35, and y is at least 30 and at the most 72. In one further embodiment, the coating comprises a compound having the formula $C_xH_yO$, wherein x is at least 16 and y is at least 26 and the compound is a non-polymer, linear, branched or cyclic, saturated or unsaturated fatty alcohol. Yet more preferably, the coating comprises a compound having the formula $C_xH_yO$, wherein x is at least 18 and at the most 35, and y is at least 30 and at the most 72 and the compound is a non-polymer, linear, branched or cyclic, saturated or unsaturated fatty alcohol. In one preferred embodiment there is provided an implant and preferably a drug eluting stent consisting of an implant's body, e.g. a stent frame having a surface that lacks structural modification as described herein and a coating layer consisting of a non-polymer, saturated or unsaturated fatty alcohol or saturated or unsaturated fatty aldehyde as described herein and at least one therapeutic agent as described herein. In one further preferred embodiment there is provided an implant and preferably a drug eluting stent consisting of an implant's body, e.g. a stent frame having a surface that lacks structural modification as described herein and a coating layer consisting of a non-polymer, saturated or unsaturated fatty alcohol as described herein and at least one therapeutic agent as described herein In another aspect, the present invention is related to the use of a non-polymer, saturated or unsaturated fatty alcohol or saturated or unsaturated fatty aldehyde as described herein and preferably having the formula $C_xH_yO$, wherein x is at least 18 and at the most 35, and y is at least 43 and at the most 72 as a coating material for medical implants, in particular for vascular stents. However, the use of a non-polymer, saturated or unsaturated fatty alcohol or saturated or unsaturated fatty aldehyde as described herein is also conceivable for other medical implants such as catheters, and in particular balloon catheters.

The use of fatty alcohols and aldehydes are preferred rather than the corresponding acid. In the case of an acid substance, it is well established that the pKa, or the acid-base dissociation constant, can greatly affect the solubility properties of that material. The pKa can be defined as the negative log of the dissociation constant:

$$pKa = -\log_{10}Ka$$

where the dissociation constant is:

$$Ka = [A^-][H^+]/[HA]$$

The relationship between pKa and pH is represented by the Henderson-Hasselbalch equation:

$$pH = pKa + \log [A^-]/[HA]$$

When $[A^-]$ and $[HA]$ are equal (acid substance is 50% ionized) the pH is equal to the pKa. At 1, 2 and 3 pH units above the pKa the substance is 90%, 99% and 99.9% ionized respectively with higher ionization providing greater aqueous solubility. Although this is typically used to describe the relative solubility of a given acidic drug substance at a given pH the same will hold for pharmaceutical excipients, binding agents and the like. The normal pH value for arterial blood is regulated between 7.35 and 7.45.

Fatty acids have been proposed for use with stents to assist with drug binding and retention during stent placement and use as well as to provide optimum drug release kinetics. Typically the drug and fatty acid are dissolved together in solvent and coated to the stent surface. The ionized nature at physiological arterial pH will result in the solubilization and gradual loss of fatty acid beneficial effects. It has been discovered that these negative solubility effects can be mitigated by the use of nonionic fatty alcohols and fatty aldehydes. An example of this can be illustrated from solubility calculations for the 18 carbon stearic fatty acid/alcohol/aldehyde series shown below. It can be seen that the non-ionic alcohol and aldehyde are far less soluble than the acid and therefore less prone to dissolve or erode and therefore better retain drug binding to stent surfaces. This solubility relationship would exist throughout the fatty alcohol and fatty and aldehyde series having the formula $C_xH_yO$ as compared to the corresponding acid. Actual in vivo conditions of temperature, concentration and drug may vary but comparative nonionic solubility characteristics of fatty alcohols and fatty aldehydes of this invention compared to the corresponding fatty acid interaction with typical nonionic, lipophilic stent use drugs such as sirolimus, paclitaxel, zotarolimus, Biolimus, everolimus and the macrocyclic trienes of this invention (like dissolves like) result in stable drug retention to smooth polymer free stent surfaces.

TABLE 1

Solubility calculations for the 18 carbon stearic fatty acid/alcohol/aldehyde

| Stearic Acid (CAS Registry Number 57-11-4) pKa = 4.78 ± 0.1 | | |
|---|---|---|
| Mass Solubility | Sparingly Soluble (0.20 g/L) | pH 7 Temp: 25° C. |
| Mass Solubility | Slightly Soluble (1.6 g/L) | pH 8 Temp: 25° C. |
| Stearic Alcohol (CAS Registry Number 112-92-5) pKa = 15.20 ± 0.1 | | |
| Mass Solubility | Sparingly Soluble (1.0E-6 g/L) | pH 7 Temp: 25° C. |
| Mass Solubility | Slightly Soluble (1.0E-6 g/L) | pH 8 Temp: 25° C. |
| Octadecanal (CAS Registry Number 638-66-4) | | |
| Mass Solubility | Sparingly Soluble (4.6E-4 g/L) | pH 7 Temp: 25° C. |
| Mass Solubility | Slightly Soluble (4.6E-4 g/L) | pH 8 Temp: 25° C. |

Mass solubility and pKa values for all the above are calculated using Advanced Chemistry Development (ACD/Labs) Software V11.02 ( © 1994-2016 ACD/Labs)

In another aspect, the present invention provides for a radially expandable stent having no surface alterations that could otherwise make the surface of the stent have a non-smooth surface. The stent of the present invention does not have a microporous surface; nor does it contain a textured or roughened surface that could serve to retard the elution characteristic of a drug bound to the stent surface. The stent of the present invention is, preferably, a topographically smooth stent having no textured or altered surface.

In another aspect, the present invention is related to the use of a non-polymer, saturated or unsaturated fatty alcohol or aldehyde as described herein and preferably having the formula $C_xH_yO$, wherein x is at least 16 and at the most 35, and y is at least 26 and at the most 72 as a coating material for medical implants, in particular for implants that make use of antiproliferative agents and further in particular for vascular stents or balloon catheters. In a preferred embodiment the present invention is related to the use of a non-polymer, saturated or unsaturated fatty alcohol as described herein and preferably having the formula $C_xH_yO$, wherein x is at least 16 and at the most 35, and y is at least 26 and at the most 72 as a coating material for medical implants, in particular for implants that make use of antiproliferative agents and further in particular for vascular stents or balloon catheters.

In a further aspect, the present invention is related to a mixture and the use thereof as coating material for medical implants as described herein of a non-polymer, saturated or unsaturated fatty alcohol or aldehyde as described herein and preferably having the formula $C_xH_yO$, wherein x is at least 16 and at the most 35, and y is at least 26 and at the most 72, and at least one antiproliferative agent. In further embodiment the present invention is related to the use of a mixture consisting of a non-polymer, saturated or unsaturated fatty alcohol or aldehyde as described herein and preferably having the formula $C_xH_yO$, wherein x is at least 16 and at the most 35, and y is at least 26 and at the most 72, a solubilizing agent and an antiproliferative agent for coating medical implants as described herein.

The at least one therapeutic agent is preferably an antiproliferative agent, preferably is a macrocyclic triene immunosuppressive compound such as rapamycin or an analog thereof, or a taxane such as paclitaxel or docetaxel. Suitable rapamycin analogs are everolimus, zotarolimus, Biolimus, temsirolimus and tacrolimus. Preferably the antiproliferative agent is a macrocyclic triene immunosuppressive compound and more preferably a macrocyclic triene immunosuppressive compound having the following structure:

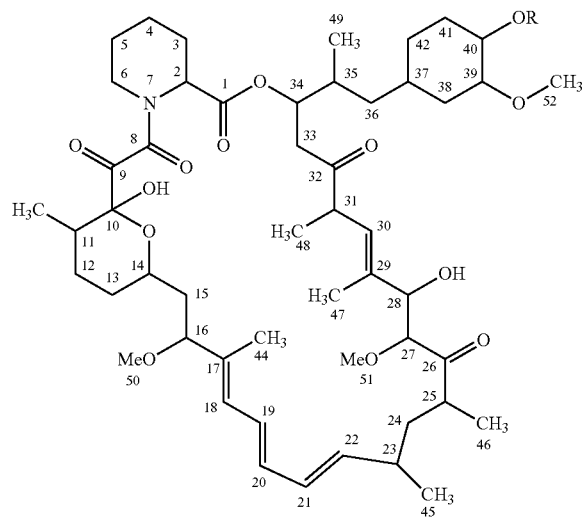

where R is $C(O)-(CH_2)_n-X$, n is 0, 1 or 2, X is a cyclic, preferably non-aromatic hydrocarbon having 3-8 carbons and optionally contains one or more unsaturated bonds as a coating material for medical implants, in particular for vascular stents. In a preferred embodiment of the use of the mixture, $C(O)-(CH_2)_n-X$ has one of the following structures:

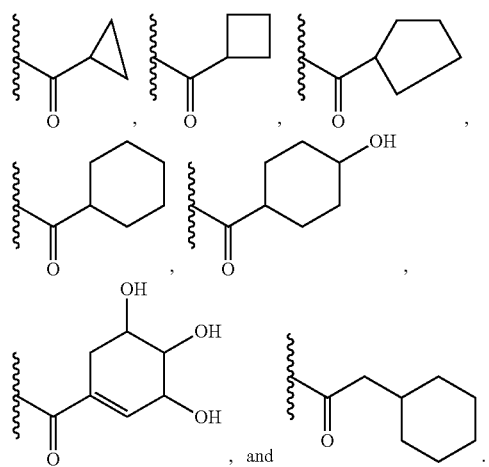

In that, the present invention is directed to an implant for use in delivering at least one therapeutic agent as defined herein to a target, comprising:
(a) an implant, preferably capable of radial expansion; and
(b) a coating layer, wherein the coating layer is formulated with at least one polymer-free excipient as described herein and at least one therapeutic agent as described herein, wherein the at least one therapeutic agent is an antiproliferative agent, wherein the coating layer is applied to the implant. It is suggested that the surface of the implant is topographically smooth as defined herein.

Further, in one embodiment the present invention is directed to a drug eluting stent for use in delivering at least one therapeutic agent as defined herein to a target, comprising:
(a) a stent frame capable of radial expansion; and
(b) a coating layer, wherein the coating layer is formulated with at least one polymer-free excipient as described herein and at least one therapeutic agent as described herein, wherein the at least one therapeutic agent is an antiproliferative agent, wherein the coating layer is applied to the stent frame. It is suggested that the stent frame has a surface that is topographically smooth as defined herein.

BRIEF DESCRIPTION OF THE FIGURES

FIG. 1 depicts a comparison of lipophilicity between the following therapeutic agents: sirolimus, everolimus, Biolimus A9™ and CRC-015.

DETAILED DESCRIPTION OF THE INVENTION

Definitions

As used herein, the term "coated" or "coating" with reference to a stent refers to compounds or substances applied to the stent surface or otherwise integral to the stent surface metal. This would include a drug or therapeutic compound, as well as any other substance that is applied to the stent surface in order to facilitate the delivery of the drug from the stent surface to a target.

As used herein, the term "elution" refers to the transfer of a drug or therapeutic agent out of the coating layer and is determined as the total amount of the drug or therapeutic agent excreted out of the coating layer as formulated with the polymer-free excipient.

As used herein, the term "excipient" refers to a natural or synthetically derived substance that is formulated in conjunction with an active agent. These substances, in the context of drug eluting stents, may be used in coatings either applied before or together or after a drug substance and are used in order to provide stability and/or optimized elution for the drug substance as it elutes from the coating to the tissue of interest.

As used herein, the term "lipids" refers to any of a group of organic compounds, including the fats, oils, waxes, sterols, and triglycerides, that are insoluble in water but soluble in nonpolar organic solvents, are oily to the touch, and together with carbohydrates and proteins constitute the principal structural material of living cells.

As used herein, the term "polymer" refers to substances composed entirely of repeating structural units or monomers, connected to each other via covalent chemical bonds.

"Non-polymer" or "polymer-free" refers to substances that are completely absent of polymers.

As used herein, the term "subject" refers to any animal, including humans, for which the administration of an adjuvant composition is desired. It includes mammals and non-mammals, including primates, livestock, companion animals, laboratory test animals, captive wild animals, reptiles, and fish.

The present invention describes methods and devices related to novel polymer-free implants and particularly to drug eluting stent technology in order to overcome the inherent problems identified in the relevant state of the art. Presently, for instance, there are several drug eluting stents on the market that utilizes either a surface modification or polymeric coating, a sampling of which is noted at Table 2.

the active site, had the major downside of contributing to thrombosis. Thus, the latest evolution of the technology has been focused on improvements to the coating substance itself, ranging from micro to nanoscale physical alterations of the stent surface to use of polymer-free type coatings (i.e. nanoparticles, endothelial cells, hyaluronic acid, heparin, antiproliferative agents, etc.)

In view of balloon catheters use of a polymer-free excipient that is capable of noncovalently binding to the implants surface has the advantage that premature loss of therapeutic agent is effectively hindered and supports transportation of the maximum load of therapeutic agent to the target site.

Stent Frame

The stent frame of the present invention may be produced from a suitable biocompatible metal and capable of insertion

TABLE 2

List of polymer free drug eluting stent devices currently on the market

| Stent | Drug (concentration) | Surface Modification | Coating Thickness (μm) | Release Kinetics (time) | Metal | Strut Thickness (μm) |
|---|---|---|---|---|---|---|
| B\|Braun Coroflex ® ISAR[1] | Sirolimus (N/A) | Microporous surface | N/A | N/A | CoCr | 55 |
| BioFreedom ® (Biosensor Europe S.Z. Corp, Morges, Switzerland)[2] | Biolimus A9 (SD: 15.6 μg/mm) (LD: 7.8 μg/mm) | Microporous surface | N/A | 90% (50 h) | SS | 112 |
| Cre8 ™ (CID Vascular, Saluggia, Italy)[2] | Amphilimus, Sirolimus (N/A) | Carbon coating/ Abluminal reservoir | N/A | 100% (3 months) | N/A | N/A |
| VESTAsync ® (MIV Therapeutics, Inc., Atlanta, GA, USA)[2] | Sirolimus (Total 50 μg) | Nanoporous, hydroxyapatite | 0.6 | 100% (3 months) | SS | 65 |
| Yukon ® (Translumina GmbH, Hechingen, Germany)[2] | Sirolimus (11.7-21.9 μg) | Microporous surface plus polymer | N/A | 67% (7 days) | SS | 87 |

[1]Massberg et al., *Circulation* 124: 624-632 (2011);
[2]Garg et al. *Nat. Rev. Cardiol.* doi: 10.1038/nrcardio.2013. 13
Abbreviations:
CoCr, Cobalt Chromium;
LD, Low Does;
N/A, Not Available;
SD, Standard Dose;
SS, Stainless Steel As evidenced by Table 2, the drug eluting stents currently in the market employ either a physical modification to the stent surface or polymeric coating in order to control the release of the drug from the stent. Not present in this Table 2 are the multitude of early generation stents, comprising only bare metal with no coatings or surface modifications, and related implants such as radially expanding balloon catheters, predominantly making use of antiproliferative agents.

There are several disadvantages associated with the stents described in the prior art, including those listed in Table 2. The early generation drug eluting stents contained biocompatible, inorganic coatings, serving mainly as an ion release barrier, with no capacity to carry a pharmaceutical payload. These metallic stent platforms (i.e. gold, iridium oxide, titanium oxide, etc.) were found to interfere with intima proliferation induced by artery injury with stent placement, resulting in the introduction of biocompatible polymeric coatings applied on the stent surface to replace the inorganic coatings. More importantly, these polymeric coatings were used as a drug carrier to store and reliably elute the drug agent to the lesion site within the artery. Unfortunately, these polymer coatings, while excellent at delivering the drug to into the vasculature of an individual. The stent frame is comprised of a metallic base comprising a material such as stainless steel, titanium or a similar biocompatible alloy thereof.

The stent frame of the present invention is substantially tubular or cylindrical in design and is capable of radial expansion when located at a desired target, such as within the vasculature or proximal to a vessel wall.

The stent frame further comprises a surface, wherein the surface is free from any texturing, pores or roughening/channeling modification such that the surface along the entirety of the tubular or cylindrical shape of the stent remains smooth without reservoirs. In one embodiment the stent frame is also free of any additional applied layers such as adhesive layer, porous layers or specific biocompatible layers. In a preferred embodiment, the stent frame is electropolished in order to be capable of achieving a microscopically smooth surface. Preferably, the surface of the stent is made microscopically smooth by electropolishing and treated with a layer of amorphous hydrogen rich silicon carbide in a plasma-enhanced, vapor deposition process. In another embodiment an additional layer may be applied to the stent surface, and preferably a silicon carbide layer may be applied to the stent surface.

Coating Layer

The present invention provides for a coating layer that is specifically formulated to combine at least one polymer-free excipient and at least one therapeutic agent. The at least one polymer-free excipient may be a saturated or unsaturated fatty alcohol or aldehyde or a nonionic, linear hydrocarbon surfactant as specified herein which is coated directly onto the surface of the stent. The at least one polymer-free excipient is capable of binding, preferably weakly, noncovalently binding to an implant body, e.g. a stent frame, and in particular to the implant surface. Once the at least one polymer-free excipient is bound to the implant body, e.g. the stent frame the excipient becomes insoluble. Preferably, the at least one polymer-free excipient is formulated with at least one therapeutic agent, with the formulation being applied and preferably spray coated onto the surface of a stent resulting in a relative non-uniform coating on the top and side stent surface.

In one embodiment of the invention the formulation consists of at least one polymer-free excipient as defined herein and at least one therapeutic agent as further specified herein. In this embodiment the formulation is directly applied, and preferably spray coated, onto the surface of the implant and in particular to the stent resulting in an implant having a coating on its surface consisting of at least one polymer-free excipient as defined herein and at least one therapeutic agent as further specified herein.

The coating layer comprising the at least one polymer-free excipient provides for no delamination of the coating layer during administration of the stent or any other implant as defined herein. Additionally and in particular, the stent requires no surface modification, as the coating layer is to be applied to a smooth surface, such as the surface of a bare metal stent.

The formulation of the coating layer provides for a combination of the at least one polymer-free excipient and the at least one therapeutic agent in a uniform composition that is preferably sprayed directly onto the surface of an implant such as a stent and in particular a bare metal stent. The at least one polymer-free excipient must be readily soluble in order to be formulated in such a manner. Preferably, the polymer-free excipient is a saturated fatty alcohol excipient that is solubilized through use of an organic compound as solubilizing agent, preferably a nonpolar organic solvent or mixture of nonpolar organic solvents.

In one embodiment, the formulation of the coating layer comprises at least 80% by weight of the at least one therapeutic agent and at least 15% by weight of the at least one polymer-free excipient. In a preferred embodiment of the invention, the formulation of the coating layer comprises from 60 to 95% by weight of the at least one therapeutic agent and 5 to 40% by weight of the at least one polymer-free excipient. The formulation may further comprise an adequate amount of a solubilizing agent, such as a suitable organic solvent, and particularly a nonpolar organic solvent to facilitate suitable application of the formulation such as spray coating. Similarly, the amount of the at least one therapeutic agent applied per implant, and in particular per stent is between 5 µg to 2000 µg, preferably from about 10 µg to about 120 µg, depending on implant size. The amount of the at least one polymer-free excipient is between 1 µg to 400 µg, preferably from about 2 µg to about 25 µg. In a most preferred embodiment, the drug load of the at least one therapeutic agent per unit length of the stent or balloon catheter is from about 1 µg/mm to about 3 µg/mm per stent and from about 0.5 µg/mm$^2$ and 10 µg/mm$^2$ per balloon catheter and preferably from about 2 to 8 µg/mm$^2$ per balloon catheter. The at least one therapeutic agent is an antiproliferative agent, preferably is a macrocyclic triene immunosuppressive compound such as rapamycin or an analog thereof.

In a more preferred embodiment, the at least one therapeutic agent is a macrocyclic triene immunosuppressive compound having the following structure:

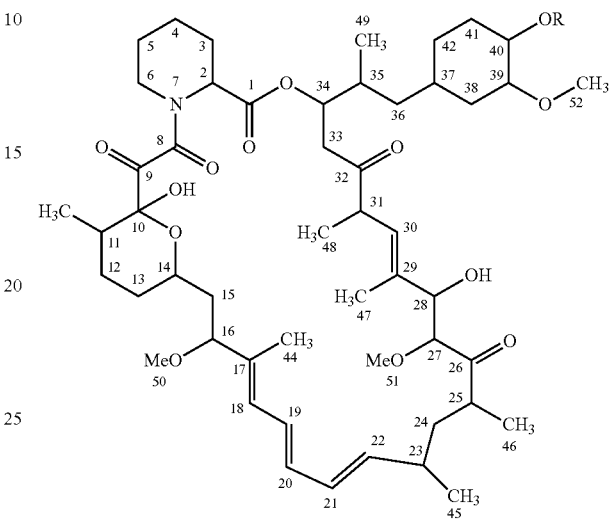

where R is C(O)—(CH$_2$)$_n$—X, n is 0, 1 or 2, X is a cyclic, preferably non-aromatic, hydrocarbon having 3-8 carbons and optionally contains one or more unsaturated bonds. In a most preferred embodiment, C(O)—(CH$_2$)$_n$—X has one of the following structures:

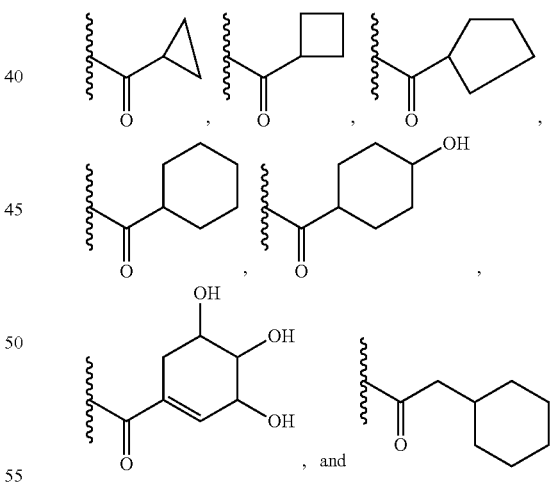

The coating layer, once formulated and applied to the surface of the implant, in particular to a stent or a balloon catheter, is prevented from flaking, peeling or delaminating from the implant stent during passage to the target site and/or deployment.

Elution

The drug eluting implant and in particular drug eluting stent of the present invention further provides for a measured elution rate based on the formulation of the coating layer as applied to the surface of the implant such as a bare metal stent. The coating layer provides for a stable elution rate that is calculated based on the disassociation of the drug from the coating layer once the stent is deployed or the implant is expanded at the target site. It is an advantage of the present invention is that the formulation comprising the Hence, CRC-015 is a term meant to encompass a genus and used to refer to each of the following species from Table 3: CRC-015a, CRC-015b, CRC-015c, CRC-015d, CRC-015e, CRC-015f and CRC-015g.

TABLE 3

Description of CRC-015 species

| Main Structure | R is C(O)—(CH$_2$)$_n$— X having one of the following structures | Species |
| --- | --- | --- |
| [macrocyclic triene structure with numbered atoms] | cyclopropyl-C(O)- | CRC-015a |
| | cyclobutyl-C(O)- | CRC-015b |
| | cyclopentyl-C(O)- | CRC-015c |
| | cyclohexyl-C(O)- | CRC-015d |
| | 4-hydroxycyclohexyl-C(O)- | CRC-015e |
| | trihydroxycyclohexenyl-C(O)- | CRC-015f |
| | cyclohexylmethyl-C(O)- | CRC-015g | at least one polymer-free excipient provides for no substantial drug loss eluted from the implant and in particular from the stent during deployment to the target site.

EXAMPLES

Example Formulations

The macrocyclic triene immunosuppressive compound of the present invention has more than one embodiment and may be described as comprising at least one of the following species from Table 3.

1. Weigh 6.25 mg 1-hexadecanol (CAS 36653-82-4, Aldrich) into a 10 mL glass vial and add 5 mL acetone. Cap the vial with a PTFE lined cap. Vortex the solution until solids have dissolved. This is labeled as 1.25 mg/mL STOCK 1-hexadecanol. Weigh 6.25 mg CRC-015 into a 3 mL glass vial and add 1 mL STOCK solution. Cap the vial and vortex the solution until solids dissolve. This formulation can be used for stent coating.
2. Weigh 6.25 mg 1-octadecanol (CAS 112-92-5, Aldrich) into a 10 mL glass vial and add 5 mL acetone. Cap the vial with a PTFE lined cap. Vortex the solution until solids have dissolved. This is labeled as 1.25 mg/mL STOCK 1-octadecanol. Weigh 6.25 mg CRC-015 into a 3 mL glass vial and add 1 mL STOCK solution. Cap the vial and vortex the solution until solids dissolve. This formulation can be used for stent coating.

3. Weigh 6.25 mg 1-hexadecanol into a 10 mL glass vial and add 5 mL chloroform. Cap the vial with a PTFE lined cap. Vortex the solution until solids have dissolved. This is labeled as 1.25 mg/mL STOCK 1-hexadecanol. Weigh 6.25 mg CRC-015 into a 3 mL glass vial and add 1 mL STOCK solution. Cap the vial and vortex the solution until solids dissolve. This formulation can be used for stent coating.

4. Weigh 6.25 mg 1-hexadecanol into a 10 mL glass vial and add 5 mL tert-butyl methyl ether. Cap the vial with a PTFE lined cap. Vortex the solution until solids have dissolved. This is labeled as 1.25 mg/mL STOCK 1-hexadecanol. Weigh 6.25 mg CRC-015 into a 3 mL glass vial and add 1 mL STOCK solution. Cap the vial and vortex the solution until solids dissolve. This formulation can be used for stent coating.

5. Weigh 6.25 mg 1-hexadecanol into a 10 mL glass vial and add 5 mL 1-chlorobutane. Cap the vial with a PTFE lined cap. Vortex the solution until solids have dissolved. This is labeled as 1.25 mg/mL STOCK 1-hexadecanol. Weigh 6.25 mg CRC-015 into a 3 mL glass vial and add 1 mL STOCK solution. Cap the vial and vortex the solution until solids dissolve. This formulation can be used for stent coating.

6. Weigh 6.25 mg 1-docosanol (CAS 30303-65-2 Aldrich) into a 10 mL glass vial and add 5 mL chloroform or 5 mL methyl tert-butyl ether. Cap the vial with a PTFE lined cap. Vortex the solution until solids have dissolved. This is labeled as 1.25 mg/mL STOCK 1-docosanol. Weigh 6.25 mg CRC-015 into a 3 mL glass vial and add 1 mL STOCK solution. Cap the vial and vortex the solution until solids dissolve. This formulation can be used for stent coating.

7. Weigh 6.25 mg 1-docosanal (CAS 57402-36-5, Matrix Scientific) into a 10 mL glass vial and add 5 mL chloroform. Cap the vial with a PTFE lined cap. Vortex the solution until solids have dissolved. This is labeled as 1.25 mg/mL STOCK 1-docosanol. Weigh 6.25 mg CRC-015 into a 3 mL glass vial and add 1 mL STOCK solution. Cap the vial and vortex the solution until solids dissolve. This formulation can be used for stent coating.

8. Weigh 6.25 mg 1-tetradecanol (CAS 112-72-1, Aldrich) into a 10 mL glass vial and add 5 mL acetone. Cap the vial with a PTFE lined cap. Cap the vial and vortex the solution until solids have dissolved. This is labeled as 1.25 mg/mL STOCK 1-tetradecanol. Weigh 6.25 mg CRC-015 into a 3 mL glass vial and add 1 mL STOCK solution. Cap the vial and vortex the solution until solids dissolve. This formulation can be used for stent coating.

9. Weigh 6.25 mg 1-eicosanol (CAS 57402-36-5, TCI) into a 10 mL glass vial and add 5 mL chloroform. Cap the vial with a PTFE lined cap. Vortex the solution until solids have dissolved. This is labeled as 1.25 mg/mL STOCK 1-eicosanol. Weigh 6.25 mg CRC-015 into a 3 mL glass vial and add 1 mL STOCK solution. Cap the vial and vortex the solution until solids dissolve. This formulation can be used for stent coating.

10. Weigh 6.25 mg 1-hexadecanol into a 10 mL glass vial and add 5 mL acetone. Cap the vial with a PTFE lined cap. Vortex the solution until solids have dissolved. This is labeled as 1.25 mg/mL STOCK 1-hexadecanol. Weigh 6.25 mg everolimus into a 3 mL glass vial and add 1 mL STOCK solution. Cap the vial and vortex the solution until solids dissolve. This formulation can be used for stent coating.

11. Weigh 6.25 mg 1-hexadecanol into a 10 mL glass vial and add 5 mL acetone. Cap the vial with a PTFE lined cap. Vortex the solution until solids have dissolved. This is labeled as 1.25 mg/mL STOCK 1-hexadecanol. Weigh 6.25 mg sirolimus into a 3 mL glass vial and add 1 mL STOCK solution. Cap the vial and vortex the solution until solids dissolve. This formulation can be used for stent coating.

12. Weigh 6.25 mg 1-hexadecanol into a 10 mL glass vial and add 5 mL acetone. Cap the vial with a PTFE lined cap. Vortex the solution until solids have dissolved. This is labeled as 1.25 mg/mL STOCK 1-hexadecanol. Weigh 6.25 mg biolimus into a 3 mL glass vial and add 1 mL STOCK solution. Cap the vial and vortex the solution until solids dissolve. This formulation can be used for stent coating.

13. Weigh 6.25 mg 1-docosanol into a 10 mL glass vial and add 5 mL acetone. Cap the vial with a PTFE lined cap. Vortex the solution until solids have dissolved. This is labeled as 1.25 mg/mL STOCK 1-docosanol. Weigh 6.25 mg sirolimus into a 3 mL glass vial and add 1 mL STOCK solution. Cap the vial and vortex the solution until solids dissolve. This formulation can be used for stent coating.

14. Weigh 6.25 mg 1-tetradecanol into a 10 mL glass vial and add 5 mL acetone. Cap the vial with a PTFE lined cap. Vortex the solution until solids have dissolved. This is labeled as 1.25 mg/mL STOCK 1-tetradecanol. Weigh 6.25 mg zotarolimus into a 3 mL glass vial and add 1 mL STOCK solution. Cap the vial and vortex the solution until solids dissolve. This formulation can be used for stent coating.

15. Weigh 6.25 mg 1-hexadecanol into a 10 mL glass vial and add 5 mL acetone. Cap the vial with a PTFE lined cap. Vortex the solution until solids have dissolved. This is labeled as 1.25 mg/mL STOCK 1-hexadecanol. Weigh 6.25 mg paclitaxel into a 3 mL glass vial and add 1 mL STOCK solution. Cap the vial and vortex the solution until solids dissolve. This formulation can be used for stent coating.

16. Weigh 12.50 mg 1-octadecanol into a 10 mL glass vial and add 5 mL acetone. Cap the vial with a PTFE lined cap. Vortex the solution until solids have dissolved. This is labeled as 2.5 mg/mL STOCK 1-octadecanol. Weigh 6.25 mg CRC-015 into a 3 mL glass vial and add 1 mL STOCK solution. Cap the vial and vortex the solution until solids dissolve. This formulation can be used for stent coating.

17. Weigh 12.50 mg pentadecanol into a 10 mL glass vial and add 5 mL chloroform. Cap the vial with a PTFE lined cap. Vortex the solution until solids have dissolved. This is labeled as 2.5 mg/mL STOCK pentadecanol. Weigh 6.25 mg CRC-015 into a 3 mL glass vial and add 1 mL STOCK solution. Cap the vial and vortex the solution until solids dissolve. This formulation can be used for stent coating.

18. Weigh 6.25 mg 1-triacontanol (CAS 593-50-0, Aldrich) into a 10 mL glass vial and add 5 mL chloroform. Cap the vial with a PTFE lined cap. Vortex the solution until solids have dissolved. This is labeled as 1.25 mg/mL STOCK 1-triacontanol. Weigh 6.25 mg docetaxel into a 3 mL glass vial and add 1 mL STOCK solution. Cap the vial and vortex the solution until solids dissolve. This formulation can be used for stent coating.

19. Weigh 6.25 mg 12-hydroxystearyl alcohol (CAS 2726-73-0, Aldrich) into a 10 mL glass vial and add 5 mL tert-butyl methyl ether. Cap the vial with a PTFE lined cap. Vortex the solution until solids have dissolved. This is labeled as 1.25 mg/mL STOCK 12-hydroxystearyl. Weigh 6.25 mg sirolimus into a 3 mL glass vial and add 1 mL STOCK solution. Cap the vial and vortex the solution until solids dissolve. This formulation can be used for stent coating.

20. Weigh 6.25 mg oleyl alcohol (CAS 143-28-2, Aldrich) into a 10 mL glass vial and add 5 mL chloroform. Cap the vial with a PTFE lined cap. Vortex the solution until solids have dissolved. This is labeled as 1.25 mg/mL STOCK oleyl alcohol. Weigh 6.25 mg paclitaxel into a 3 mL glass vial and add 1 mL STOCK solution. Cap the vial and vortex the solution until solids dissolve. This formulation can be used for stent coating.

I. Formulation and Application of Coating Layer onto Stent

The specific macrocylic triene immunosuppressive compound, known herein as CRC015, was formulated with the polymer-free, saturated fatty alcohol excipient and directly applied, via spray coating, onto a balloon crimped stent. A solubilizing agent was used in order to make the saturated fatty alcohol readily soluble and to accommodate the formulation with the macrocyclic triene prior to spray coating.

A unique property of CRC015 is its lipophilicity, particularly when compared to derivative substances. As seen in FIG. 1, CRC015 is approximately 1000 times more lipophilic than sirolimus, 500 times more lipophilic than everolimus and 100 times more lipophilic than Biolimus A9™, which serves to increase its bioavailability.

CRC015 and the excipient were weighed in a precision balance at the ratio of 83.3:16.7, with the solvent being volumetrically determined. The formulation was then vortexed and fully dissolved in the solvent solution.

The formulation was then spray coated onto a bare stent, with the stent being rotated in between each longitudinal spray pass until it completed a circular rotation of 360 degrees. The stents in each batch were assayed for the total CRC015 dose coated thereon using an Agilent 1290 High Performance Liquid Chromatography (HPLC) system in order to ensure that the target dose for each stent was achieved.

Once applied, the resulting coating layer was analyzed and found to bind readily to the smooth, texture-free top and side surface of the stent. The resulting coating layer was also found to be stable during sterilization and packaging processes. Further analysis found the coating layer to be free from flaking, peeling or delamination during deployment.

II. 28 Day Porcine Restenosis Model

A study was conducted in order to compare CRC015 (Group 1) against commercial stents having either bare metal with no drug (Group 2) or sirolimus eluting with poly-l-lactide (PLLA) coating (Group 3). All three Groups used a cobalt chromium (CoCr) coronary stent in the present study. The bare metal control group served to evaluate the influence of drug eluting coating and the drug respectively on the durability of the polymer-free scaffolds and the biological vessel response. The devices were implanted in porcine coronary arteries using a balloon:artery ratio of 1.15:1.00.

Table 4 indicates the test and control devices utilized in the study.

TABLE 4

Test/control groups in 28 day porcine study

| Study Group | Description | Device Size | Drug/Unit Length |
|---|---|---|---|
| Group 1 | CoCr coronary stent system with CRC015 coating | 3.0 × 22 mm | 2.5 µg/mm |
| Group 2 | CoCr coronary stent system | 3.0 × 22 mm | 0.0 µg/mm |
| Group 3 | CoCr coronary stent with sirolimus + PLLA coating | 3.0 × 22 mm | 6.1 µg/mm |

Efficacy was evaluated angiographically through assessment of neointimal hyperplasia at harvest. Angiographic results indicated that the stent-implanted vessels of Group 1 yielded lower diameter stenosis and late lumen loss values than either the sirolimus+PLLA coated stent (Group 3) or the control group with no drug (Group 2), as described further in Table 5.

TABLE 5

Mean diameter stenosis and late lumen loss at 28 days

| Study Group | Drug Weight Amount (µg) | Drug per Unit Length (µg/mm) | Angiographic Late Lumen Loss (mm) | Diameter Stenosis (%) |
|---|---|---|---|---|
| Group 1 | 55 | 2.5 | 0.14 | 6.2 |
| Group 2 | 0 | 0 | 0.32 | 17.8 |
| Group 3 | 134 | 6.1 | 0.27 | 9.7 |

Surprisingly, Group 1, which contained the CRC015 drug eluting stent, evidenced a significant reduction in both the angiographic late lumen loss, as well as diameter stenosis. This finding was unexpected, particularly in view of the fact that Group 1 received a nearly 60% lower drug dosing by weight when compared to Group 2, which contained the sirolimus+PLLA coating. This demonstrates that the unique formulation of CRC015 with the polymer-free excipient of the present invention provides for a marked improvement for the treatment indicators for vascular restenosis when compared to sirolimus+polymer coating on a stent.

What is claimed is:

1. An implant for use in delivering at least one therapeutic agent to a target, comprising:
   (a) a drug eluting stent capable of radial expansion; and
   (b) a coating layer, wherein the coating layer is formulated with at least one polymer-free excipient and at least one therapeutic agent, wherein the at least one therapeutic agent is an antiproliferative agent, further wherein the coating layer consists of the at least one polymer-free excipient and the at least one therapeutic agent, wherein at least one polymer-free excipient of the at least one polymer free excipient is a non-polymer, linear, branched or cyclic, saturated or unsaturated fatty alcohol or fatty aldehyde, wherein the fatty alcohol or fatty aldehyde contains at least 16 carbon atoms, and wherein the formulation of the coating layer ranges from 60 to 95% by weight of the at least one therapeutic agent and 5 to 40% by weight of the at least one polymer-free excipient.

2. The implant of claim 1, wherein the at least one therapeutic agent is a macrocyclic triene immunosuppressive compound.

3. The implant of claim 1, wherein the implant is devoid of any surface modification that would result in a drug reservoir at more than one point on the implant body surface.

4. The implant of claim 1, wherein the at least one therapeutic agent is selected from the group consisting of rapamycin, everolimus, zotarolimus, umirolimus, temsirolimus, tacrolimus or analogs thereof.

5. The implant of claim 1, wherein the at least one therapeutic agent is selected from the group consisting of paclitaxel, docetaxel or analogs thereof.

6. The implant of claim 1, wherein the formulation of the coating layer has a composition of at least 80% by weight of the at least one therapeutic agent and at least 15% by weight of the at least one polymer-free excipient.

7. The implant of claim 1, further wherein the at least one polymer free excipient binds to the implant body.

8. The implant of claim 1, wherein the at least one therapeutic agent has the following structure:

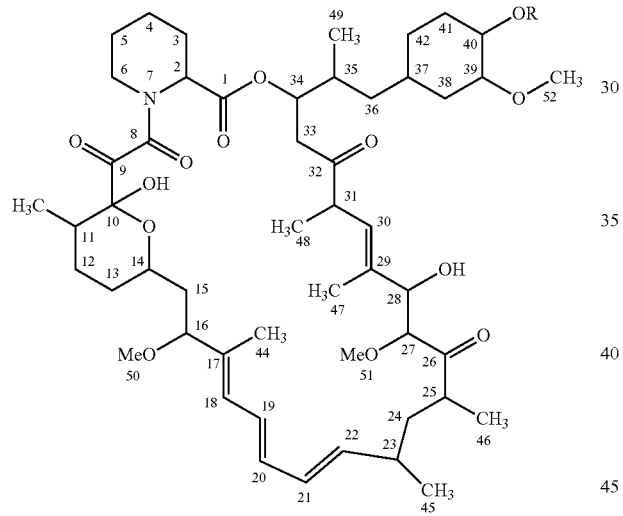

where R is C(O)—(CH$_2$)$_n$—X, n is 0, 1 or 2, X is a cyclic hydrocarbon having 3-8 carbons and optionally contains one or more unsaturated bonds.

9. The implant of claim 8, further wherein C(O)—(CH$_2$)$_n$—X has one of the following structures:

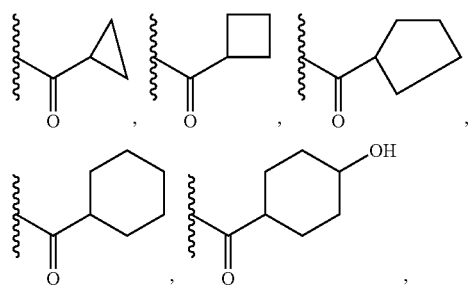

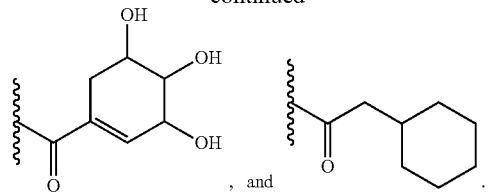

10. The implant of claim 1, wherein the implant is a stent and the surface of the stent is made microscopically smooth by electropolishing and treated with a layer of amorphous hydrogen rich silicon carbide in a plasma-enhanced, vapor deposition process.

11. A method of delivering at least one therapeutic agent to an individual, comprising:
providing a drug eluting implant;
providing a coating material, wherein the coating material consists of at least one polymer-free excipient and at least one therapeutic agent, wherein the at least one therapeutic agent is an antiproliferative agent, further wherein the coating material is formulated to range from 60 to 95% by weight of the at least one therapeutic agent and 5 to 40% by weight of the at least one polymer-free excipient, and wherein at least one polymer-free excipient of the at least one polymer free excipient is a non-polymer, linear, branched or cyclic, saturated or unsaturated fatty alcohol or fatty aldehyde, wherein the fatty alcohol or fatty aldehyde contains at least 16 carbon atoms, wherein the drug eluting implant has a surface that is nonporous;
applying the coating material to the nonporous surface of the drug eluting implant; and
administering the drug eluting implant to an individual in need thereof.

12. The method of claim 11, wherein the antiproliferative agent is a macrocyclic triene immunosuppressive compound having the following structure:

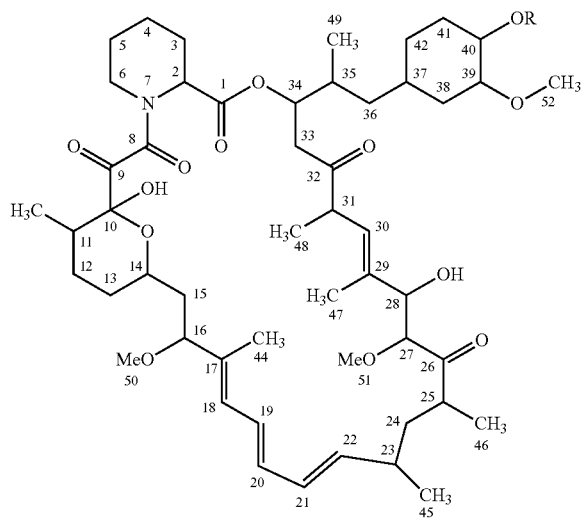

where R is C(O)—(CH$_2$)$_n$—X, n is 0, 1 or 2, X is a cyclic hydrocarbon having 3-8 carbons and optionally contains one or more unsaturated bonds.

13. The implant of claim 1, wherein the fatty alcohol or fatty aldehyde has the formula CxHyO, wherein x is at least 20 and at the most 35, and y is at least 32 and at the most 72.

14. The implant of claim 1, wherein the drug load of the at least one therapeutic agent per unit length of the stent is from about 1 µg/mm to about 3 µg/mm.

* * * * *